US011971606B2

(12) United States Patent
Guzman et al.

(10) Patent No.: US 11,971,606 B2
(45) Date of Patent: Apr. 30, 2024

(54) ADJUSTABLE ALIGNMENT MOUNT

(71) Applicant: Massachusetts Institute of Technology, Cambridge, MA (US)

(72) Inventors: Andrew Guzman, Wakefield, MA (US); Joseph Flaherty, Boston, MA (US); Steven R. Gillmer, Somerville, MA (US); Kevin Edward Sullivan, Medford, MA (US); Steven Augst, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 517 days.

(21) Appl. No.: 16/953,001

(22) Filed: Nov. 19, 2020

(65) Prior Publication Data

US 2021/0231913 A1 Jul. 29, 2021

Related U.S. Application Data

(60) Provisional application No. 63/020,423, filed on May 5, 2020, provisional application No. 62/967,503, filed on Jan. 29, 2020.

(51) Int. Cl.
*G02B 7/182* (2021.01)

(52) U.S. Cl.
CPC .................... *G02B 7/1825* (2013.01)

(58) Field of Classification Search
CPC ..................................... G03B 7/1825
See application file for complete search history.

(56) References Cited

U.S. PATENT DOCUMENTS

| 5,678,944 | A | 10/1997 | Slocum |
| 2003/0086748 | A1* | 5/2003 | Culpepper ............... G12B 5/00 403/13 |
| 2007/0169310 | A1 | 7/2007 | Heuser et al. |
| 2011/0292527 | A1 | 12/2011 | Frankovich et al. |
| 2014/0317453 | A1* | 10/2014 | Holt ................... G01R 31/2887 714/44 |
| 2016/0377385 | A1 | 12/2016 | Culp |

OTHER PUBLICATIONS

International Search Report and Written Opinion dated Mar. 9, 2021, for Application No. PCT/US2020/061342.
Slater, A beam quality metric for high energy lasers. High Energy Laser Joint Tech Office. May 26, 2016. 18 pages.

* cited by examiner

*Primary Examiner* — Euncha P Cherry
(74) *Attorney, Agent, or Firm* — Wolf, Greenfield & Sacks, P.C.

(57) ABSTRACT

A ruggedized adjustable mounting system is described for adjustably coupling and selectively locking a component supported in a fixture of the mount in a desired orientation. In some embodiments, the mounting system includes one or more kinematic couplings that support a fixture on a base and one or more adjustable couplings that are configured to adjust a separation distance between two opposing portions of the fixture and the base to selectively pivot the fixture about one or more axes of rotation.

22 Claims, 5 Drawing Sheets

ADJUSTABLE ALIGNMENT MOUNT

CROSS-REFERENCE TO RELATED APPLICATIONS

This application claims the benefit under 35 U.S.C. § 119(e) to U.S. provisional application Ser. No. 62/967,503, filed Jan. 29, 2020 and to U.S. provisional application Ser. No. 63/020,423, filed May 5, 2020, the disclosures of each of which are incorporated herein by reference in their entirety.

GOVERNMENT LICENSE RIGHTS

This invention was made with Government support under FA8702-15-D-0001 awarded by the U.S. Air Force. The Government has certain rights in the invention.

FIELD

Disclosed embodiments are related to adjustable alignment mounts and their methods of use.

BACKGROUND

Adjustable alignment mounts may be used to control the movement and positioning of components, such as optical components, for any number of degrees of freedom with varying levels of precision and difficulty. For example, alignment mounts may be used to control the relative alignment of optical components such as mirrors or lenses within a laser system.

SUMMARY

In one embodiment, an adjustable alignment mount includes a fixture configured to support one or more components, a base, one or more kinematic couplings configured to couple the fixture to the base, and one or more adjustable couplings configured to selectively adjust a separation distance between one or more adjacent portions of the fixture and the base. Adjusting the separation distance between the one or more adjacent portions of the fixture and the base may cause the fixture to rotate about the one or more kinematic couplings.

In another embodiment, a method of adjusting a relative orientation of a component supported by a fixture assembly relative to a base includes: adjusting a spacing between one or more portions of the fixture and the base using one or more adjustable couplings; and rotating the fixture relative to the base about one or more kinematic couplings disposed between the fixture and the base.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
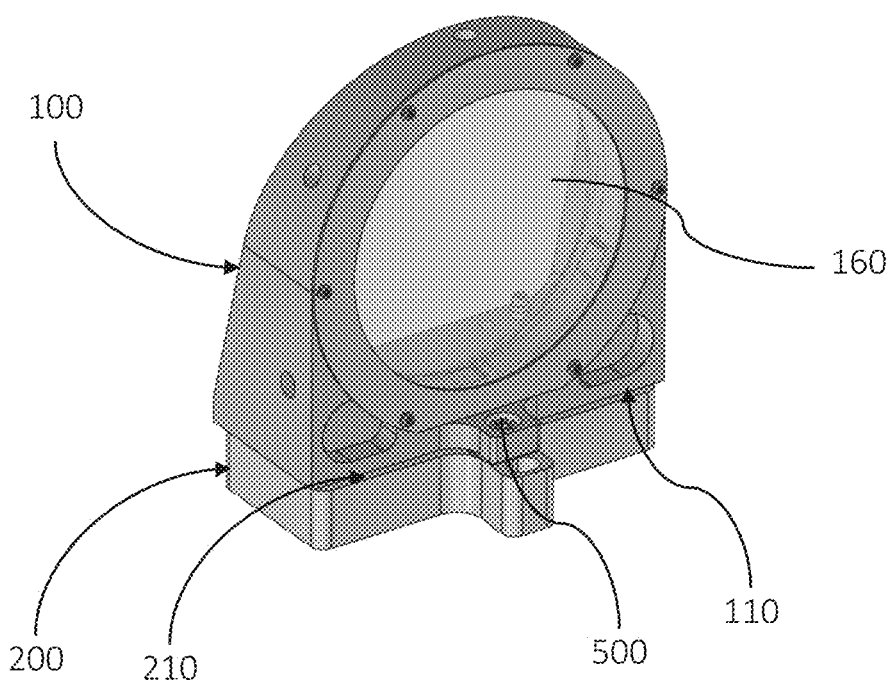
FIG. 1A is a front perspective view of a first embodiment of a fixture and base of an adjustable alignment mount.
Figure 1B:
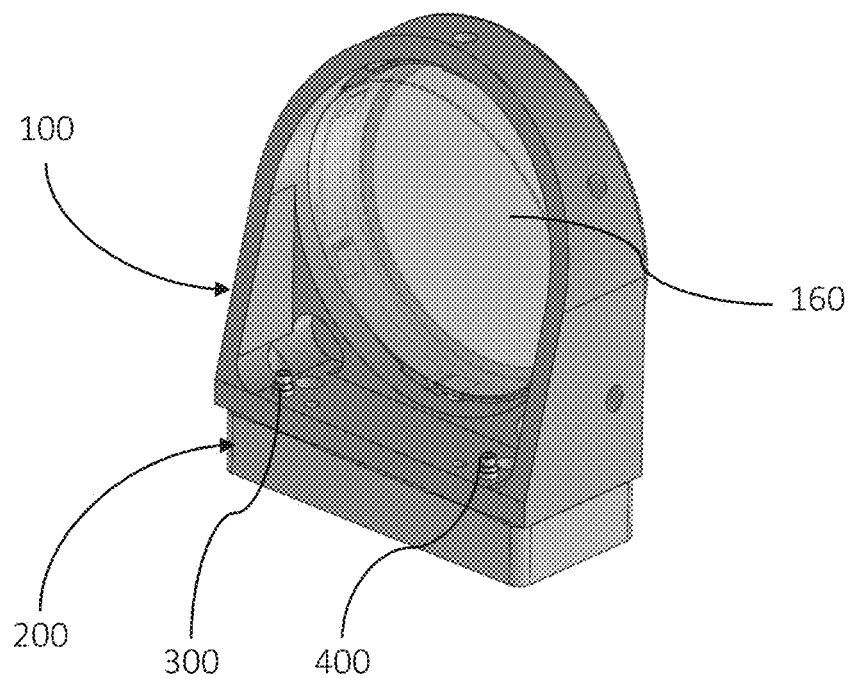
FIG. 1B is a rear perspective view of the mount of FIG. 1A.

Existing alignment mounts often include compromises that make them unsuitable for specific applications. Standard gravity, magnetic, or spring held kinematic mounts (e.g., spring held ball/cone, ball/vee, ball/flat mounts) offer a high degree of precision, however, the delicacy of these mounts makes them ill-suited for most non-laboratory environments as even relatively minor shocks and vibrations can cause shifts and misalignment. Fasteners with precision lapped shims offer improved stability under motion or perturbations, but are time consuming and difficult to install and adjust. Bonding provides great stability under even the harshest conditions by fixing or joining mounts with adhesives, welding, or contact bonding and requires little to no change of the overall form factor. However the permanent nature of these set bonds prevent future adjustments should they become desirable. Accordingly, the Inventors have recognized that typical alignment mounts do not provide various desired combinations of precision, ease of adjustment, and/or ruggedized locking for certain applications.

In view of the above, the Inventors have recognized the benefits of an adjustable alignment mount that includes a fixture and a base that are coupled to one another using one or more kinematic couplings and one or more adjustable couplings configured to adjust a spacing between one or more corresponding adjacent portions of the fixture and the base. The kinematic couplings and the adjustable couplings may cooperate with one another such that when the spacing between the portions of the fixture and base are adjusted, the fixture rotates about the kinematic couplings relative to the base to adjust an orientation of a component supported by the fixture. To provide stability, in some embodiments, the one or more kinematic couplings and the one or more adjustable couplings may be moved between an unlocked configuration in which the spacing adjustment and rotation may occur and a locked configuration in which the fixture and base are rotationally and translationally locked in place relative to one another as described further below.

While the disclosed adjustable alignment mounts may be used to adjust the alignment of any appropriate component for any desired application, in some embodiments, the disclosed mounts may be used for adjusting the alignment of optical systems such as the optics within a laser system. This may be particularly beneficial in that the alignment of the optical components within a laser system may be precisely aligned prior to being locked in place which may provide easy adjustments and rugged performance in such applications.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIGS. 1A through 3 show a first embodiment of an adjustable alignment mount that adjustably couples a component such as a mirror 160 to an associated support, not depicted, that the mount is attached to. In this embodiment, the mount includes a fixture 100 with a mirror 160 or other component mounted thereto. The mount also includes a base 200 that the fixture is adjustably coupled to at an interface formed between opposing surfaces 110 and 210 of the fixture and base that are oriented towards and located proximate to one another in the assembled configuration. In certain embodiments, it may be desirable to adjust an orientation of the fixture 100 relative to the base to control an orientation of the component 160 held in the fixture. For example, it may be desirable to pivot the fixture 100 and the component 160 about one or more axes relative to the base 200. In such cases, adjustable couplings between the fixture and base may be used to adjust, and in some instances lock, an orientation of the fixture and the component relative to the base. Further, as elaborated on below, this locking may be sufficiently rugged such that the fixture 100 and base 200 remain rigidly fixed relative to each other even when one or both is subjected to external forces (e.g., vibrations, accelerations, moments, impacts, etc.).

In certain embodiments, the interface between the fixture 100 and the base 200 may include three couplings, although any suitable number of couplings may be used in alternate embodiments. In the embodiment shown, the first and second couplings 300 and 400 may be kinematic couplings between the fixture and the base. For instance, the first coupling is depicted as a kinematic ball/cone coupling assembly, and the second coupling is depicted as a modified ball/vee coupling assembly 400. When loosened, but not at the fully removed state, the first two kinematic couplings may function as an axis that the fixture may pivot around relative to the base where the axis passes through the pivot points of the two separate couplings. Correspondingly, a third adjustable coupling 500 may be included to adjustably couple the fixture and base. The third adjustable coupling may be any appropriate construction capable of adjusting a spacing between adjacent opposing portions of the fixture and base to cause the fixture, and the associated mirror 160 or other component, to pivot about the axis extending between the other two kinematic couplings. In the depicted embodiment, the first and second kinematic couplings 300 and 400 may be located on opposing sides of a central axis of the fixture and on opposing surfaces of the interface between the fixture 100 and base 200. The third adjustable coupling 500 may be located at a position offset from the axis extending between the first and second kinematic couplings, which in the depicted embodiment is a central portion of the fixture and base offset towards the rear of the mount. As also illustrated in the figures, in some embodiments, the three couplings 300, 400, 500 may be arranged in the shape of an isosceles triangle with the third coupling located equidistant from both the first and second kinematic couplings. However, it should be appreciated that any suitable arrangement of the couplings between the fixture and base is possible as the disclosure is not limited in this respect.

Figure 2:
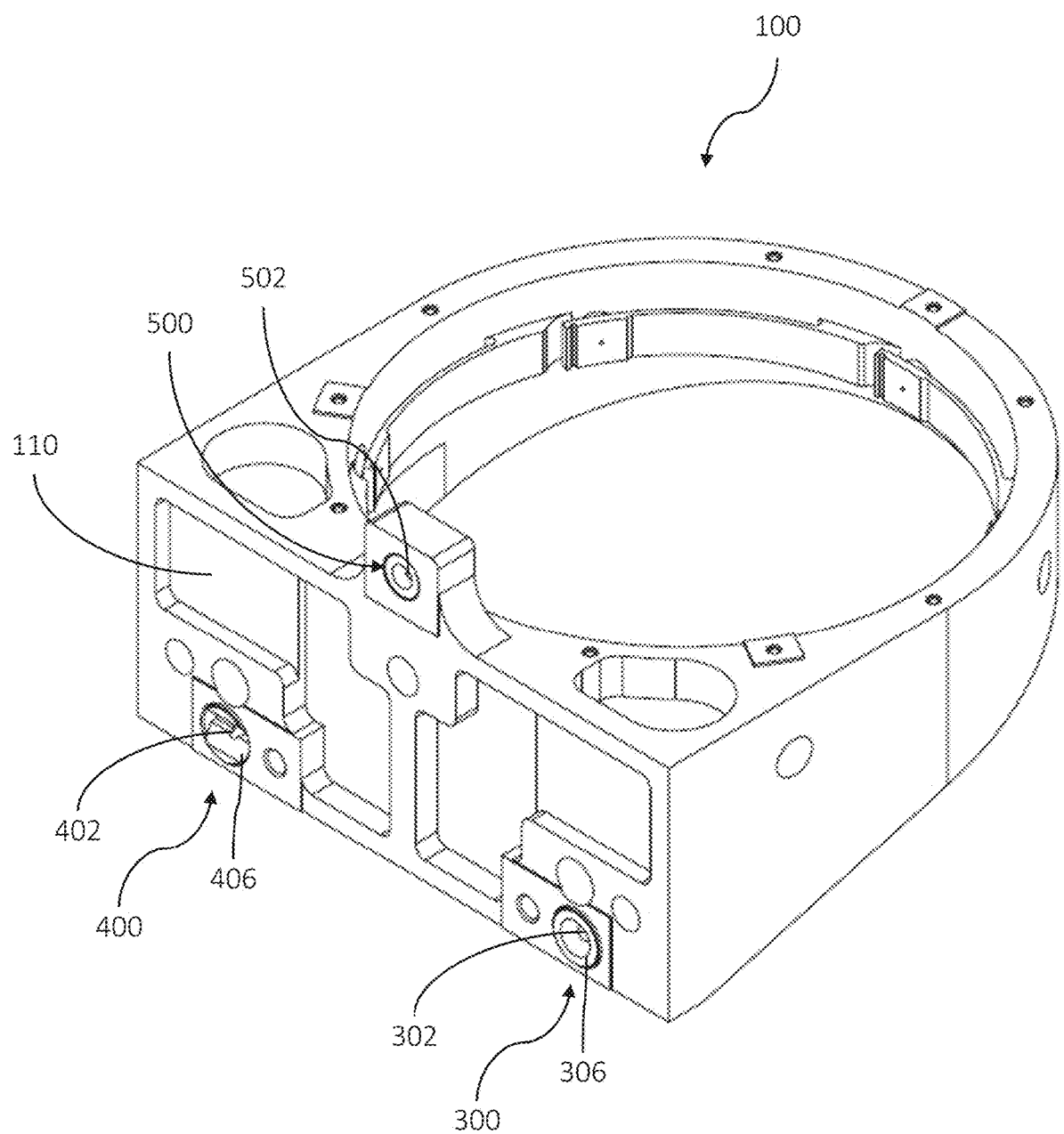
FIG. 2 is a bottom isometric view of the fixture of the mount of FIG. 1A.

FIG. 2 shows the underside of one embodiment of the fixture 100. From this view, it is possible to see the kinematic cone 306 and vee 406 corresponding to a recessed elongated channel with a "V" shape and a recessed cone disposed in the bottom surface of the fixture corresponding to the location of the first and second couplings 300 and 400. Through holes 302 and 402 pass through the fixture extending from an interface surface 110 to a second opposing surface of the fixture at the location of the kinematic cone 306 and the kinematic vee 406 respectively. Separately, the fixture 100 also includes a third through hole 502 that extends between opposing surfaces of the fixture at a location coaxially aligned with the third coupling. These holes allow threaded fasteners, such as bolts, threaded shafts, set screws, or other appropriate couplings capable of holding the fixture to the mount, to pass through the fixture 100 for selectively coupling the fixture to the base as elaborated on below.

Figure 3:
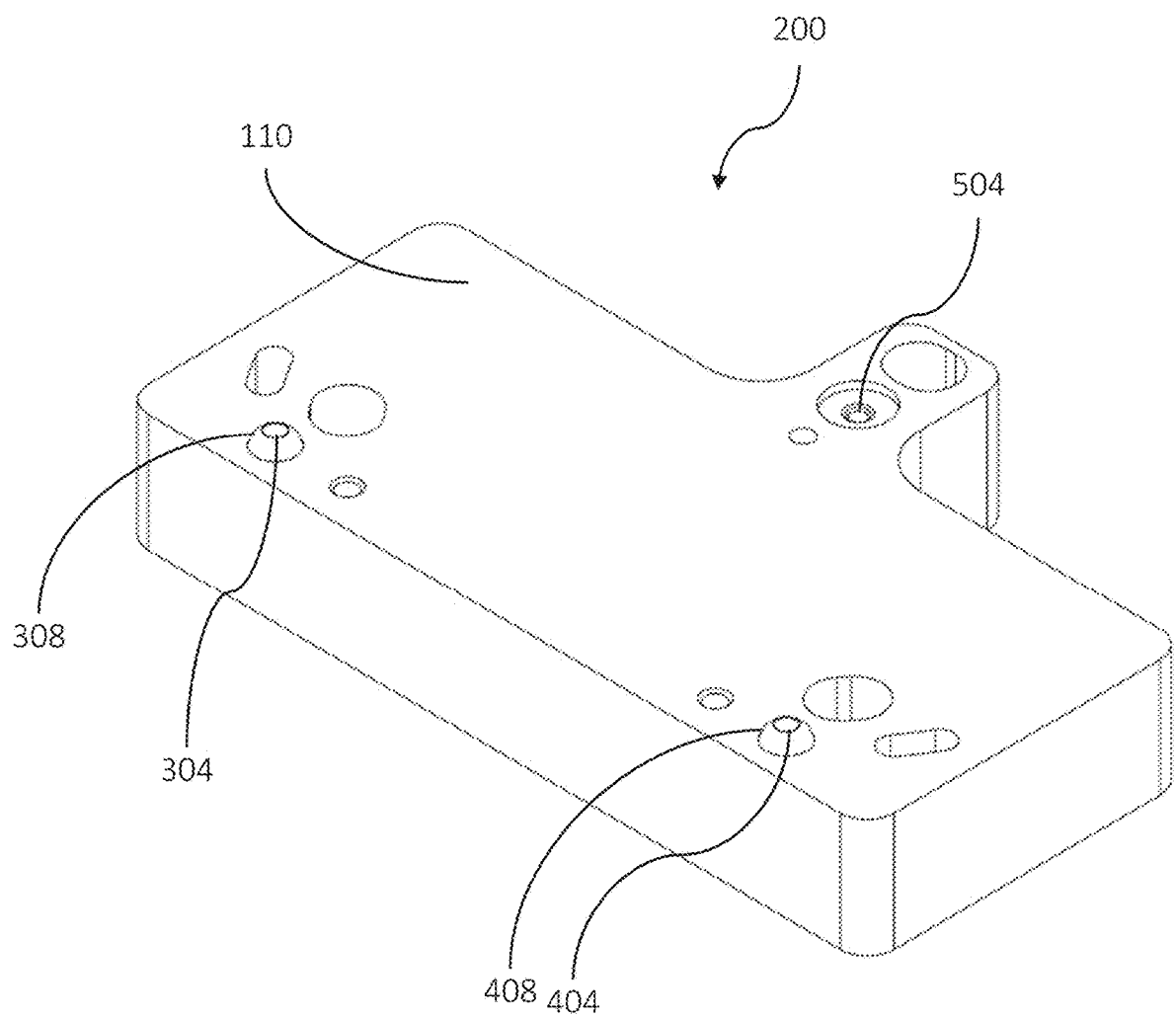
FIG. 3 is a top isometric view of the base of the mount of FIG. 1A.

FIG. 3 shows the topside of base 200 which is located opposite from an interface surface 110 of the fixture, not depicted. From this view, it is possible to see kinematic balls 308 and 408 disposed at locations of the base corresponding to the first and second couplings such that the kinematic balls will engage with the kinematic cone 306 and kinematic vee 406 of the fixture, shown in FIG. 2, to form a kinematic coupling. Holes 304 and 404 are formed in and extend through a central portion of the kinematic balls such that they extend at least partially through, and in some instances completely through, the base. These holes formed in the base for the first and second couplings are aligned with the through holes formed in the kinematic cone and vee of the fixture. Correspondingly, a third hole 504 extends at least partially, or entirely, through the base and is aligned with the third hole of the fixture to form a portion of the third adjustable coupling. Passing the fasteners through the kinematic balls and a corresponding location on the kinematic cone and/or vee as described herein may provide many advantages including reduced strains at the interface of the fixture and base. This may lead to a higher degree of stability during locking which may significantly reduce the occurrence of misalignment. In contrast, using fasteners that are attached at a location adjacent to the kinematic balls may result in increased strain and bending which may cause misalignment. An example of a kinematic coupling is provided in further detail below.

While the above embodiment uses kinematic balls disposed on the base and a kinematic cone and vee disposed on the fixture, the opposite arrangement could also be used as the disclosure is not limited to which part includes a particular portion of a kinematic coupling. Additionally, while kinematic balls have been illustrated in the figures, kinematic canoe spheres or other appropriate constructions may also be used. For example, canoe spheres have increased contact area under load. Thus, the use of canoe spheres for a kinematic coupling may further reduce stress, therefore permitting greater locking preloads and/or less surface wear under repeated locking and/or unlocking.

In certain embodiments, such as those shown in FIGS. 2 and 3, all of the kinematic components are shown in recessed portions of surfaces 110 and 210 to prevent translational motion, although in other embodiments they may be flush with the surface, or on bosses that protrude from the surface. To prevent rotational motion, these kinematic cone, vee, and balls may be potted, for example using an epoxy such as AMS3739, although any suitable potting or other appropriate attachment and/or formation method may be used as the disclosure is not limited to how the portions of the kinematic couplings are formed in or attached to the portions of an adjustable mount.

Figure 4:
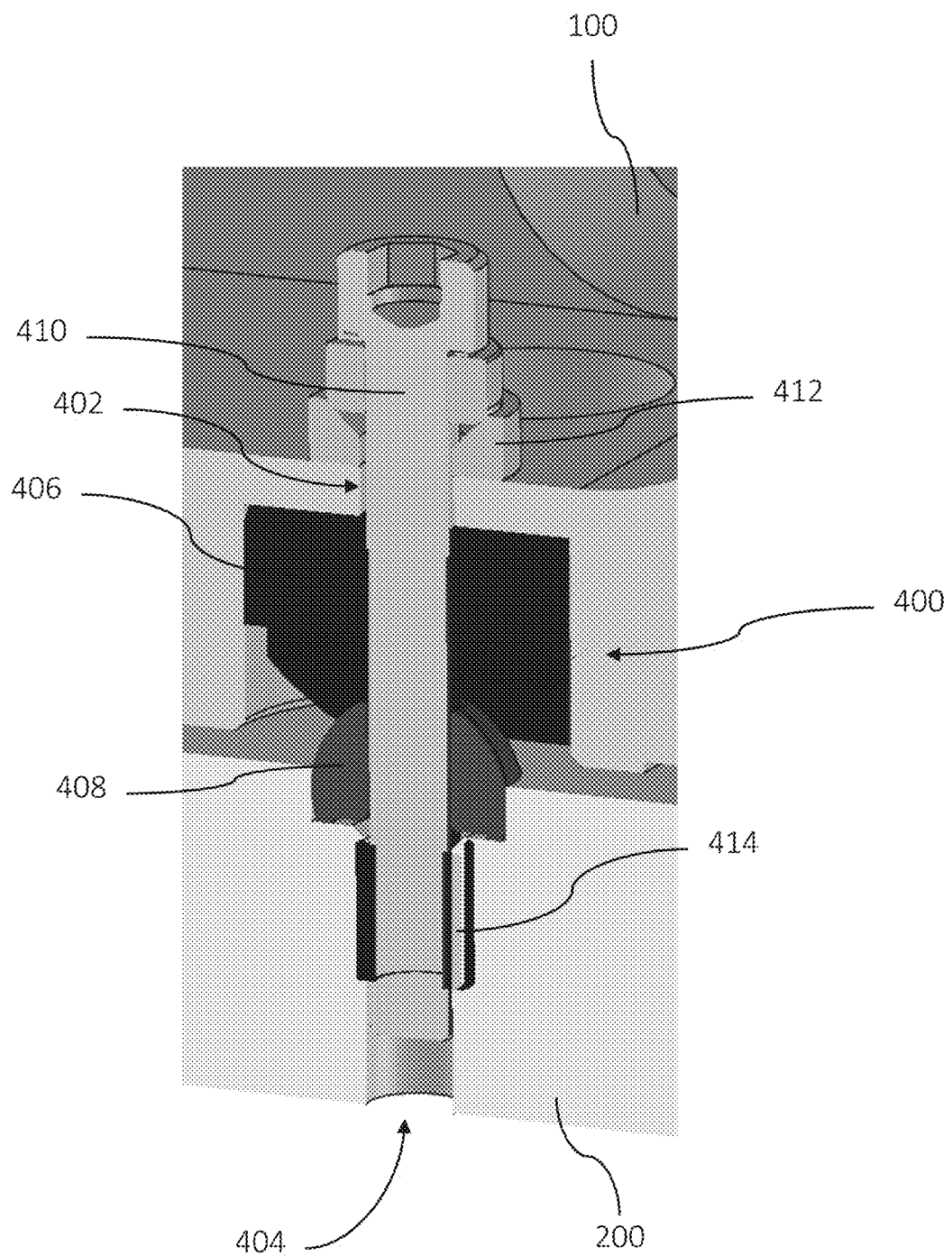
FIG. 4 is a cross sectional view of one embodiment of a kinematic vee coupling.

FIG. 4 illustrates the construction of the first kinematic coupling of the mechanical interface between fixture 100 and base 200. Specifically, the coupling is a modified kinematic vee assembly 400. As described earlier, the fixture 100 may include a through hole 402 and the base 200 may include a corresponding aligned through hole 404. As shown in the cross-sectional image, the through holes pass through the kinematic vee 406 of the fixture and the kinematic ball 408 that is in contact with the kinematic vee. When aligned with one another the through holes 402 and 404 form an overall combined through hole that extend completely through the fixture and base. However, instances in which the combined through hole does not extend completely through both the fixture and base are also contemplated. Once aligned, a threaded fastener 410 is positioned into the through holes of the fixture and base with the kinematic vee 406 of the fixture disposed on the kinematic ball 408 or other structure of the base. The threaded fastener 410 may then be threaded into a threaded portion 414 of the through hole formed in the base to attach the fixture to the base with the kinematic coupling therebetween. The threaded portion of the through hole is illustrated as a threaded insert. However, an integrally formed thread, a nut, or other appropriate corresponding threaded structure could also be used. In some embodiments, a spherical washer 412 is positioned between a head of the threaded fastener 410 and a corresponding surface of the fixture, or other component, the head is located proximate to. The use of a spherical washer may help to make adjustment and lockdown of the coupling more controlled and stable while reducing positional error by permitting the threaded fastener 410, or other coupling to be oriented at various angles relative to the fixture which may reduce the bending stresses applied to the fastener 410. As shown in FIG. 4, the through holes 402 and 404 may also have a clearance between the maximum transverse dimension (e.g. a diameter) of the threaded fastener 410 and a maximum transverse dimension (e.g. a diameter) of the through hole. This may reduce the likelihood that unintentional forces and stresses will be translated through the kinematic coupling via the threaded fastener 410.

During operation, when the threaded fastener 410 is fully tightened, the kinematic vee 406 is compressed against the kinematic ball 408 to lock an orientation of the fixture 100 and base 200 relative to one another with the kinematic coupling in a locked configuration. In contrast, when the threaded fastener 410 is loosened, i.e. the kinematic coupling is in an unlocked configuration, relative movement including, for example, rotation of the fixture relative to the base about an axis of rotation extending between the kinematic couplings is possible. While not shown, the second coupling of the mechanical interface between the fixture 100 and base 200 is a modified kinematic cone assembly 300 and operates in a similar manner with the substitution of the kinematic coupling described above.

Figure 5:
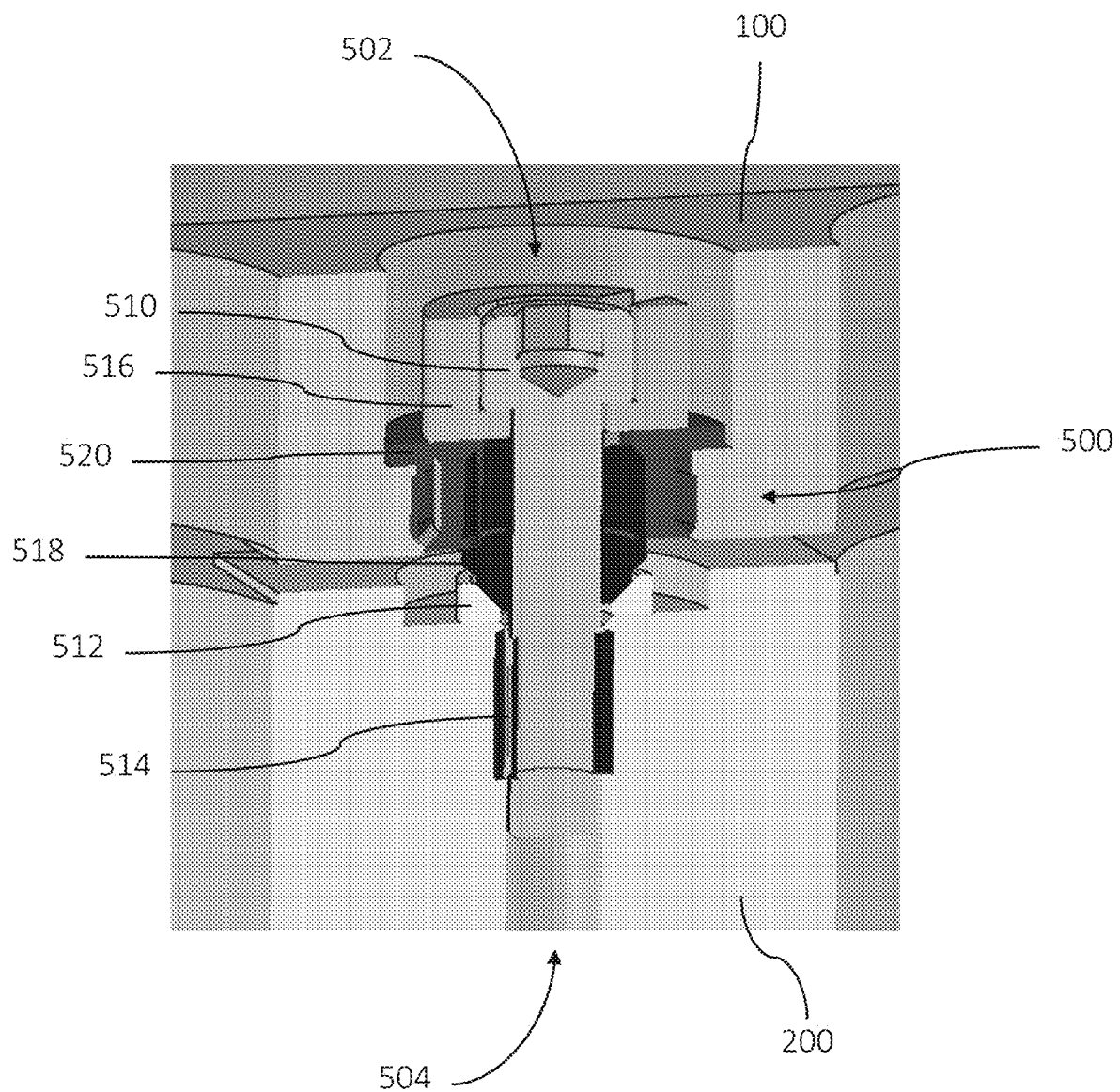
FIG. 5 is a cross sectional view of one embodiment of an adjustable coupling.

As best shown in FIG. 5, the third adjustable coupling 500 of the mechanical interface between fixture 100 and base 200 is a coupling that may adjust a separation distance between two opposing portions of the fixture and base. The depicted embodiment corresponds to an externally threaded adjustment bushing 520 with a locking fastener passing through it. However, other appropriate constructions capable of adjusting a separation distance between the fixture and base may also be used. The specific construction is elaborated on below. As described earlier, the fixture 100 may include a through hole 502 aligned with a hole 504 formed in the base 200. The aligned holes may form a combined through hole that runs completely through each of the respective components. However, embodiments in which the overall through hole only passes through a portion of one of the components is also contemplated. In either case, the through holes may be constructed such that when sufficiently aligned, a threaded fastener may be placed into the combined through hole and engaged with a threaded portion 514 of the through hole, such as the threaded insert, located in the base. The coupling includes a threaded adjustment nipple 518, a keyed nipple adjuster 516, a socket head screw 510, and a floating washer 512 that are positioned on the threaded fastener. In the depicted embodiment, an additional bushing 520 may be provided such that the assembly does not directly contact the fixture 100. This may be done in some embodiments to enable increased tolerances. The benefit of this coupling arrangement for an adjustable coupling is that the application of the holding force may be located precisely at the center of the adjustment point. This may minimize the presence of undesired stresses in the fixture 100 and base 200.

During operation, tightening or loosening of the threaded fastener 510 vertically raises or lowers the portion of the fastener attached to the fixture relative to threaded insert or other threaded portion 514 of the base. Thus, the adjustable coupling may adjust a separation distance between opposing surfaces of a portion of the fixture and base. Once appropriately positioned, the threaded fastener may then be tightened relative to the components located in the fixture to lock the vertical position of the fixture relative to the base. When it is desired to adjust the position again, the threaded fastener may be unlocked and adjusted again prior to relocking. As base 100 and fixture 200 are kinematically coupled at kinematic cone 300 and kinematic vee 400, this vertical adjustment of the separation distance between adjacent portions of the fixture and base results in a pivoting motion about a single axis formed by the axis of rotation extending between the kinematic couplings.

The Inventors note that height adjustment systems are typically used in sets of three. In contrast, the embodiment as shown and described herein uses one or more adjustable couplings in combination with one or more kinematic couplings. This configuration enables the use of one or more axes of rotation without over-constraint or the adjustment of unnecessary degrees of freedom. This enables easy robust adjustment of a desired number of degrees of freedom of a mount without unnecessary complication.

For the sake of clarity, the embodiment shown in the figures is described with a single axis of rotation defined between two kinematic couplings and a single adjustable coupling that may adjust a separation distance between adjacent portions of a mount and fixture. However, in some embodiments, a second axis of rotation, that may be orthogonal or otherwise angled relative to the first, could also be achieved by using a kinematic coupling in combination with two adjustable couplings that are configured to selectively adjust the separation distance between adjacent portions of the fixture and the base at two spaced apart locations. Such a system may include similar arrangements of the couplings as described above and may be operated in the same manner with the minor modification that a separation distance between two separate adjacent portions of the fixture and base may be adjusted while the fixture is rotated about a point formed by the corresponding single kinematic coupling. The kinematic coupling and adjustable couplings may then be tightened to lock the mount in place once the fixture, and the corresponding component are appropriately positioned.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An adjustable alignment mount comprising:
   a fixture configured to support one or more components;
   a base;
   one or more kinematic couplings configured to couple the fixture to the base; and
   one or more adjustable couplings configured to selectively adjust a separation distance between one or more adjacent portions of the fixture and the base, and wherein adjusting the separation distance between the one or more adjacent portions of the fixture and the base causes the fixture to rotate about the one or more kinematic couplings,
   wherein the one or more adjustable couplings are configured to lock a distance between opposing surfaces of the fixture and the base.

2. The mount of claim 1, wherein the one or more kinematic couplings includes at least one selected from the group of a kinematic ball, a kinematic canoe sphere, a kinematic cone, and a kinematic vee.

3. The mount of claim 1, wherein each of the one or more kinematic couplings includes a through hole passing through an associated kinematic coupling of the one or more kinematic couplings and a threaded fastener disposed in the through hole and engaged with a corresponding thread disposed in the base or fixture, wherein the threaded fastener is configured to selectively lock the associated kinematic coupling to lock an orientation of the fixture and base relative to each other.

4. The mount of claim 1, wherein the one or more kinematic couplings includes two kinematic couplings and the one or more adjustable couplings includes one adjustable coupling.

5. The mount of claim 1, wherein the one or more kinematic couplings includes a single kinematic coupling and the one or more adjustable couplings includes two adjustable couplings.

6. The mount of claim 1, wherein the one or more kinematic couplings are configured to be locked and unlocked.

7. The mount of claim 1, wherein the component supported by the fixture is an optical component.

8. The mount of claim 1, wherein each of the one of more adjustable couplings includes a through hole passing through an associated adjustable coupling of the one or more adjustable couplings and a threaded fastener is disposed in the through hole and engaged with a corresponding thread disposed in the base or fixture, wherein the threaded fastener is configured to selectively lock the distance between the opposing surfaces of the fixture and the base.

9. The mount of claim 1, wherein the one or more kinematic couplings and the one or more adjustable couplings are disposed on the fixture.

10. The mount of claim 1, wherein the one or more kinematic couplings and the one or more adjustable couplings are disposed on the base.

11. A method of adjusting a relative orientation of a component supported by a fixture relative to a base, the method comprising;
    adjusting a spacing between one or more portions of the fixture and the base using one or more adjustable couplings;
    rotating the fixture relative to the base about one or more kinematic couplings disposed between the fixture and the base; and
    locking the spacing between the fixture and the base using the one or more adjustable couplings.

12. The method of claim 11, wherein the one or more kinematic couplings includes at least one selected from the group of a kinematic ball, a kinematic canoe sphere, a kinematic cone, and a kinematic vee.

13. The method of claim 11, wherein each of the one or more kinematic couplings includes a through hole passing through an associated kinematic coupling of the one or more kinematic couplings and a threaded fastener disposed in the through hole and engaged with a corresponding thread disposed in the base or fixture, and further comprising locking the associated kinematic coupling with the threaded fastener to lock an orientation of the fixture and base relative to each other.

14. The method of claim 11, wherein the one or more kinematic couplings includes two kinematic couplings and the one or more adjustable couplings includes one adjustable coupling.

15. The method of claim 11, wherein the one or more kinematic couplings includes a single kinematic coupling and the one or more adjustable couplings includes two adjustable couplings.

16. The method of claim 11, wherein the one or more one or more kinematic couplings are configured to be locked and unlocked.

17. The method of claim 11, wherein an optical component is supported by the fixture.

18. The method of claim 11, wherein each of the one of more adjustable couplings includes a through hole passing through an associated adjustable coupling of the one or more adjustable couplings and a threaded fastener is disposed in the through hole and engaged with a corresponding thread disposed in the base or fixture, and further comprising locking the associated adjustable coupling with the threaded fastener to lock the distance between the opposing surfaces of the fixture and the base.

19. The method of claim 11, wherein the one or more kinematic couplings and the one or more adjustable couplings are disposed on the fixture.

20. The method of claim 11, wherein the one or more kinematic couplings and the one or more adjustable couplings are disposed on the base.

21. The mount of claim 1, wherein the one or more kinematic couplings comprise a kinematic ball/cone coupling and a kinematic ball/vee coupling, and wherein the one or more adjustable couplings are configured to lock a distance between opposing surfaces of the fixture and the base using at least one locking fastener passing through at least one of the one or more adjustable couplings.

22. The method of claim 11, wherein the one or more kinematic couplings comprise a kinematic ball/cone coupling and a kinematic ball/vee coupling, and wherein locking the spacing between the fixture and the base using the one or more adjustable couplings comprises passing at least one locking fastener through at least one of the one or more adjustable couplings.

* * * * *